United States Patent Office 3,385,893
Patented May 28, 1968

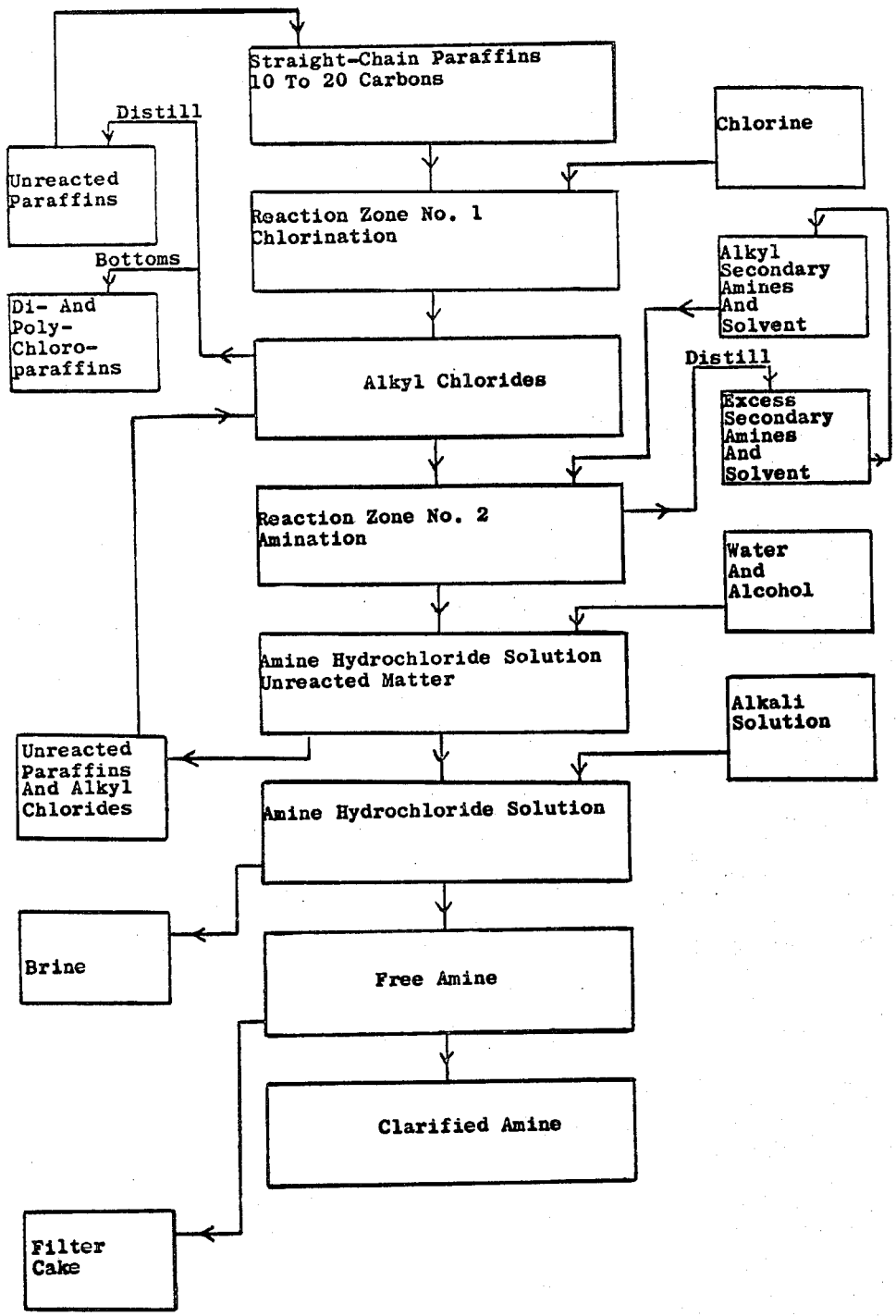

3,385,893
PROCESS FOR MAKING LONG CHAIN
UNBRANCHED ALKYL TERTIARY
AMINES
Reginald L. Wakeman, Philadelphia, Pa., assignor to Millmaster Onyx Corporation, New York, N.Y., a corporation of New York
Continuation-in-part of application Ser. No. 384,489, July 22, 1964. This application June 28, 1965, Ser. No. 467,543
9 Claims. (Cl. 260—583)

ABSTRACT OF THE DISCLOSURE

This relates to the preparation of long chain unbranched aliphatic tertiary amines by subjecting straight-chain paraffins, in the preferred range of 10 to 20 carbon atoms, to chlorination. The resultant alkyl chlorides are then converted into suitable tertiary amines by reacting, under pressure, with an excess of an alkyl secondary amine, such as dimethyl amine, at about 100° to about 250° C. over a period of about 4 to 20 hours. The alkyl tertiary amine hydrochloride formed in the reaction is then separated from the reaction mixture and is treated with an alkaline solution to yield the free tertiary amine.

The object of the present invention is the preparation of long chain unbranched aliphatic tertiary amines of low cost.

This application is a continuation-in-part of Ser. No. 384,489, filed July 22, 1964, now abandoned.

Tertiary amines which possess useful and valuable properties are well known to the art. They are, however, rather costly, being usually prepared from naturally occurring fatty alcohols such as are present in spermaceti and the like, or otherwise from fatty acids or their esters by reduction, as by hydrogenation. Methods well known to the art for preparing the amines consist, in general, of such processes as converting the fatty alcohols to their halides, followed by reaction of these halides with secondary amines to form tertiary amines as their hydrohalides from which they can be recovered by treatment with alkali solution; or by such stepwise processes as the saponification of naturally occurring fats with ammonia; the dehydration of the ammonium soaps to the amides; the further dehydration of the amides to the corresponding nitriles; followed by hydrogenation to produce mixtures of mainly primary and secondary plus some tertiary long chain amines which may be separated by fractional distillation into suitable fractions, one of which is the preferred primary amine; this in turn is followed by alkylation, as by means of formaldehyde and formic acid by a modified Mannich reaction; or by reaction with an alkyl halide such as methyl chloride to yield tertiary amine hydrohalides from which the free amines can be obtained by adding a solution of caustic alkali. By this means are obtained tertiary amines containing one long hydrocarbon radical plus two short radicals such as methyl, along with more or less tertiary amine containing two long chain and one short chain radicals.

These tertiary amines which may be either mixtures containing a wide series of homologous amines, or as the result of distillation a narrower range of such homologs, or where desired a segregated amine of a definite chain length, may then be further processed by reacting them under suitable conditions as, for example, with an oxidizing agent such as hydrogen peroxide, an organic peroxide, or ozone and the like, to produce amine oxides. Such oxidation processes are well known to the art and are in use for the manufacture of certain surface active agents of commercial value. The tertiary amines may also be processed by treating them with alkylating agents such as methyl chloride, ethyl bromide, benzyl chloride, dimethyl sulfate and the like, in which case quaternary ammonium salts are formed. These compounds are valuable articles of commerce with a wide range of applications, including such uses as sanitization and disinfection, fabric softening and the prevention of the accumulation of static electric charges. The tertiary amines may also be used to prepare amphoteric surface active agents of the betaine type as, for example, by reaction with chloro acetic acid or its salts and the like. Other uses for these fatty tertiary amines will be readily apparent to those skilled in the art.

These operations, because of their complexity, are necessarily costly. Since the raw materials either naturally occurring or synthesized are also relatively expensive, the end products often have been of limited commercial applicability, solely for economic reasons.

This invention proposes to reduce these costs substantially by employing materials of low cost; namely, straight chain paraffins obtained either from suitable grades of petroleum oil or synthetically derived from the condensation of ethylene by methods now in commercial use. The preferred range of chain lengths for the synthesis of tertiary amines of wide commercial applicability is from 10 to 20 carbon atoms.

Straight chain paraffins are to be preferred over their branched chain isomers for various reasons, principal of which are: (1) polychlorination is more likely on the branched chain; (2) chlorination is most likely on the tertiary carbons, and such halides are less reactive; and (3) the surface active properties of branched chain compounds are inferior for a given molecular weight to those of the straight chain analogs.

Where naturally occurring, i.e., petroleum based, paraffins are to be used, they can be separated from their branched chain isomers by methods well known to the art and of present commercial application; among these processes are those involving the use of "molecular sieves" and those in which urea adducts are prepared and separated and resolved.

Straight chain paraffins of the preferred range of 10 to 20 carbons are subjected to chlorination at temperatures ranging from 0° to 100° C., but preferably 30° to 70° C. Actinic light, iodine or other suitable catalyst may be employed, if desired. Reaction is continued until from 5 to 125% of the theoretically calculated amount of chlorine has reacted, but preferably about 10 to 30% of the theoretical amount in order to prevent or to minimize polychlorination. We may chlorinate to the higher degree should we desire to obtain di-chloroparaffins as well; such can be recovered or separated by fractional distillation as by-products of value. However, such distillation is not a necessary part of the process at this stage.

The alkyl chlorides so obtained are then converted into sutiable tertiary amines as, for example, the alkyl dimethyl amines, by reacting them under pressure with an excess of dimethyl amine at temperature ranging from 100° to 250° C., but preferably at 140° to 160° C. over a period of from 4 to 20 hours until no further reaction occurs; this point may be determined by argentometric titration. Preferably a quantity of a polar solvent is included in the reaction mixture to increase the reaction rate.

On completion of reaction, the unreacted excess of dimethyl amine or other amine used in the process is recovered for reuse by distillation and water is added to dissolve the tertiary amine hydrochloride formed, with or without the addition of alcohol or the like to facilitate clear separation.

The amine hydrochloride solution is removed and upon addition of the required amount of alkali to liberate the free amine from its salt, the product separates as an oily layer. This may be clarified as by filtration to remove gross dirt, and it may be dried as by heating to drive off the small amount of dissolved or dispersed water, or it may be used in its crude form. For the sake of good color, it is desirable to rid it of such foreign matter.

The unreacted paraffin and chloroparaffin on drying may be used for recycling.

The recovered tertiary amine may then be converted into the tertiary amine oxide, if desired, by reacting it with aqueous hydrogen peroxide, for example, with or without the addition of a solvent such as ethyl alcohol or isopropanol, by heating the mixture with agitation at temperatures ranging from the ambient to about 100° C., the reaction rate and the color of the product being optimum at about 40° to 80° C. Upon completion of the reaction, the product exists as a single phase and a dilute solution thereof in water is clear.

Other reactions of the tertiary amines and some of their products are illustrated in the following examples.

The drawing, FIGURE 1, illustrates a flow chart embodying the novel features of my process. This chart illustrates graphically the essential sequence of steps of my process in producing straight chain alkyl chlorides, starting with straight chain paraffins, preferably having 10 to 20 carbon atoms. The flow chart also indicates how the unreacted paraffins may be recovered and recycled for reuse. Also, the dichloro- and other polychloroparaffins may be separated from the alkyl chlorides which are to be treated further. The chart also indicates that the excess or unreacted amines which are used to react with the alkyl chlorides are distilled from the reaction zone and reused. Thereafter, the chart indicates that the unreacted paraffins and chloroparaffins may be separated from the solution of tertiary amine hydrochloride in which they are not soluble and returned for recycling, following which the tertiary amines are liberated from their combination with HCl by treatment with caustic alkali. The tertiary amines may then be clarified and dried. The process can be carried out continuously by means of suitable apparatus so as to yield maximum yields with efficient utilization of all materials used in the process by recycling and recovering unreacted agents which are re-used, thereby reducing costs.

The amines so produced may then be reacted with hydrogen peroxide to form amine oxides, or they may be treated with other reactants instead to form other surface active compounds.

Example I 299 grams or 1.5 mols of a straight chain paraffin cut of which 95% was N-tetradecane was chlorinated in an agitated glass flask under diffused daylight, the chlorine gas being introduced by means of a fritted glass sparger at 35° to 50° C. with cooling as required to moderate the exothermic reaction. When the weight increase amounted to 60 grams or 115% of the theoretical amount of chlorine for monochlorination, the product was heated in vacuo to remove dissolved chlorine and hydrogen chloride.

The material was then distilled, to remove a forerun of unreacted hydrocarbon, and then to obtain a main cut amounting to 51% of the still charge. Vapor phase chromatographic analysis indicated a monochlorotetradecane content of 70%, or 36% of available monochloride on the total charge.

Example II

A commercially available mixture of N-aliphatic hydrocarbons of $C_{12}$ to $C_{14}$ chain length, obtained from Shell Chemical Company, was chlorinated in a similar manner to that of Example I. 265 grams of the hydrocarbon was reacted with 50 grams of chlorine at 50° C. during three hours.

The crude product was distilled to yield a forerun of 145 grams of unreacted material, a main cut of 106 grams, and a still bottoms of 30 grams.

The main fraction assayed 18.7% of combined chlorine; the theoretical content for a $C_{13}$ chain length is 16.25%.

Example III 396 grams or 2.0 mols of the tetradecane of Example I was agitated in a glass flask under diffused daylight and chlorine was bubbled in via a fritted glass diffuser; the charge was cooled to moderate the exothermic reaction which was conducted at about 35° C.

Reaction was continued until 21 grams weight increase had occurred, equivalent to absorption of 30% of the theoretical amount of chlorine for monochlorination.

The reaction mass was heated in vacuo to remove the dissolved gases and then to distill off the unreacted hydrocarbon. The residue in the flask amounted to 125 grams which assayed 15.6% combined chlorine.

Example IV

In a similar manner, N-decane, N-dodecane, N-hexadecane and N-octadecane and mixtures of straight chain paraffins of chain lengths of the range of $C_{10}$ to $C_{20}$ were chlorinated.

Example V 100 grams of the topped chlorotetradecane of Example III was reacted with dimethyl amine in a stainless steel pressure vessel at 140° to 150° C. for a period of seven hours. The dimethyl amine was in the form of a 25% solution in isopropanol and in 300 mol percent proportion to the alkyl chloride.

The excess dimethyl amine was distilled off along with the isopropanol. The residue was taken up in water and extracted with petroleum ether to remove inert material such as hydrocarbons and residual alkyl chloride. The aqueous layer containing the tetradecyl dimethyl amine hydrochloride was then treated with caustic soda solution to liberate the amine as an oily layer which was washed and dried. The yield was 90 grams.

Example VI 33.5 grams of the tetradecyl dimethyl amine of Example V was dissolved in 80 grams of isopropanol and 35 grams of water in a flask equipped with a mechanical stirrer, a reflux condenser, and a dropping funnel charged with 10 grams of 50% hydrogen peroxide. The solution was warmed to 40° C. and the hydrogen peroxide was added while maintaining the temperature between 40° and 80° C., cooling and heating as required. The reaction was continued for several hours until the mixture was homogeneous and gave a clear solution in water. The resulting tetradecyl dimethyl amine oxide was adjusted to 15% strength.

Example VII

The topped chlorides of Examples III and IV were reacted with dimethyl amine as in Example V and stripped of excess dimethyl amine and alcohol. The alkyl dimethyl amine was liberated from the hydrochloride by means of treatment with sodium hydroxide solution and the crude amine was vacuum dried without extraction with solvent. After filtration to remove gross dirt, a portion of the crude amine was converted into the corresponding amine oxide by the procedure of Example VI. Other portions were reacted with alkylating agents as described in succeeding examples.

Example VIII

The main fraction of $C_{12}$ to $C_{14}$ monochloride of Example II was reacted with dimethyl amine solution under less drastic conditions than those prescribed in Example V. 47.5 grams of the alkyl chloride and 150 grams of a 22% solution of dimethyl amine in isopropanol were heated at 100° C. for nine hours and then cooled.

Titration of an aliquot of the resulting solution with silver nitrate indicated 1.24% of ionic chlorine, whereas at full reaction, 4.43% should theoretically be present; under these conditions, 28% of the halide had reacted to form the corresponding $C_{12}$ to $C_{14}$ dimethyl amine.

The solution was stripped of dimethyl amine and alcohol, the residue was taken up in water and extracted with petroleum ether to remove unreacted or inert matter, and the aqueous layer was made alkaline with caustic soda in order to separate out the oily amine as in Example V.

Example IX 123 grams or 0.51 mol of tetradecyl dimethyl amine prepared by the method of Example V and 63 grams or 0.50 mol of benzyl chloride were heated under reflux in an agitated flask along with 180 grams of water at 80° to 100° C., until the mixture became homogeneous and then for one-half hour longer. At the end of this period, argentometric titration indicated that the reaction was substantially complete. The product was a yellow viscous solution of tetradecyl dimethyl benzyl ammonium chloride.

Example X

The washed and dried $C_{12}$ to $C_{14}$ dimethyl amines of Example VIII were reacted with benzyl chloride in the same manner and in the same molar proportion as in Example IX.

The product was tested bacteriologically by the Official Phenol Coefficient Method of the U.S. Department of Agriculture against S. typhosa and S. aureus. The respective phenol coefficients on the 100% basis were 287 and 250.

Example XI

Dodecyl dimethyl amine, one of the products of Example VII, was reacted in stoichiometric proportion with chloro acetic acid. Three parts by weight of the latter and one part of propylene glycol were agitated in a three-neck flask while the dodecyl dimethyl amine was added. The temperature rose sharply to about 55° C. The mixture was heated further to about 80° C., when the reaction became strongly exothermic, and it was necessary to apply cooling to maintain a temperature of 100°–110° C. This temperature was maintained for three hours, at the end of which time argentometric titration indicated about 95% completion.

The product, the hydrochloride of dodecyl dimethyl betaine, was then neutralized in a second agitated flask containing two equivalents of caustic soda in aqueous solution, to which it was slowly added while agitating and cooling. The final product had a pH of 6.0, and is the sodium salt. It is an effective foaming and wetting agent and is amphoteric in character, containing both a carboxyl and an amino group.

Although in the above examples, dimethyl amine was employed as a reactant with the paraffinic chlorides, other secondary amines may be employed as well, for example, diethyl amine, morpholine and the like, and under more vigorous conditions, diethanolamine and methyl ethanolamine and the like.

I claim:
1. The process of making long chain unbranched alkyl tertiary amines which comprises the steps of treating a straight chain paraffin containing from 10 to 20 carbon atoms with chlorine at a temperature of 0° to 100° C., treating the resulting alkyl chloride with an alkyl secondary amine at a temperature of 100° to 250° C., separating the alkyl tertiary amine hydrochloride formed thereby from the reaction mixture and treating said tertiary amine hydrochloride with an alkaline solution to yield the free alkyl tertiary amine.

2. The process of claim 1 wherein the straight chain paraffin is subjected to chlorination at a temperature from about 30° to about 70° C.

3. The process of claim 1 wherein the chlorinated paraffin is treated to separate the monochloroparaffin therefrom.

4. The process of claim 1 wherein the alkyl monochloride is reacted with an excess of alkyl secondary amine at a temperature from 140° to 160° C. for a period of about 4 to 20 hours in the presence of a polar solvent until no further reaction occurs.

5. The process of claim 4 wherein the unreacted excess of alkyl secondary amine is recovered by distillation and reused for reacting with additional straight chain chloroparaffin.

6. The process of claim 1 wherein the alkyl monochloride is treated with an excess of alkyl secondary amine in the presence of a polar solvent.

7. The process of claim 1 wherein the straight chain paraffin reacted with chlorine comprises a mixture of n-aliphatic hydrocarbons of $C_{12}$ to $C_{14}$ chain length to produce corresponding monochloro hydrocarbons and the said monochloro hydrocarbons are reacted with dimethyl amine in the presence of isopropanol.

8. The process of claim 1 wherein the alkyl secondary amine is a member of the group consisting of dimethyl amine, diethyl amine, diethanolamine, methyl ethanolamine and morpholine.

9. The process of claim 1 wherein the straight-chain paraffin is a member of the group consisting of n-tetradecane, n-decane, n-dodecane, n-hexadecane, n-octadecane, and a mixture of n-aliphatic hydrocarbons of $C_{12}$ to $C_{14}$ chain length.

References Cited

UNITED STATES PATENTS

| | | | |
|---|---|---|---|
| 3,267,147 | 8/1966 | Sheeran | 260—583 |
| 3,272,881 | 9/1966 | Kapur et al. | 260—668 |
| 3,287,411 | 11/1966 | Wakeman | 260—585 |
| 3,299,142 | 1/1967 | Simpson | 260—585 |

NICHOLAS S. RIZZO, *Primary Examiner.*

ALEX MAZEL, JOSE TOVAR, *Examiners.*